Nov. 1, 1927.

J. C. BOGLE 1,647,602

HINGED CONSTRUCTION

Filed Aug. 2, 1923

Witness:
P. J. Haselton

Inventor:
JOHN C. BOGLE
By Jones, Addington, Ames, & Seibold
Attys

Patented Nov. 1, 1927.

1,647,602

UNITED STATES PATENT OFFICE.

JOHN C. BOGLE, OF OAK PARK, ILLINOIS, ASSIGNOR TO COOK ELECTRIC COMPANY, OF CHICAGO, ILLINOIS, A CORPORATION OF ILLINOIS.

HINGED CONSTRUCTION.

Application filed August 2, 1923. Serial No. 655,289.

This invention relates to cable terminals and more particularly to cable terminals adapted to be mounted in positions unprotected from the weather, such for example as upon poles or buildings.

The device comprising this invention is adapted for use in connection with the open wire distribution of telephone lines or the like from lead-covered aerial cables. Such cables are usually composed of a large number of pairs of paper-insulated wires and since the paper insulation is effective only when dry, suitable moisture proof means should be provided at the end of the cable, enabling the conductors to be carried to the exterior of the lead sheath without permitting moisture to enter the cable or interfere with the insulation at the end of the cable. One aim of the present invention is to provide an improved means fulfilling the above requirements.

The open wire distribution from cable terminals of the above indicated character is usually effected by the use of twin-conductor insulated wires, known as "twisted pair". A large number of such insulated wires leading into a single cable terminal housing will possess considerable bulk and it is accordingly desirable if the housing is provided with a cover, to also provide means to restrain the group of wires so that they cannot bulge and force open the cover. It is desirable to provide a cover for the terminal housing which is practically weather-proof and which also may be latched in an open position permitting the operator to use both hands for making connections.

Accordingly, a further aim of this invention is the provision of a cable terminal arranged in a suitable housing provided with a cover which may be conveniently latched in closed position for restraining the group of lead wires from bulging and which may be also latched in an open position when desired.

Another object of this invention is to provide a terminal of the character indicated which is inexpensive to manufacture, convenient to install and operate, and which is very durable even if subjected to unfavorable service conditions.

Other objects and advantages will appear from the following detailed description and claims taken in connection with the accompanying drawings, in which—

Figure 1:
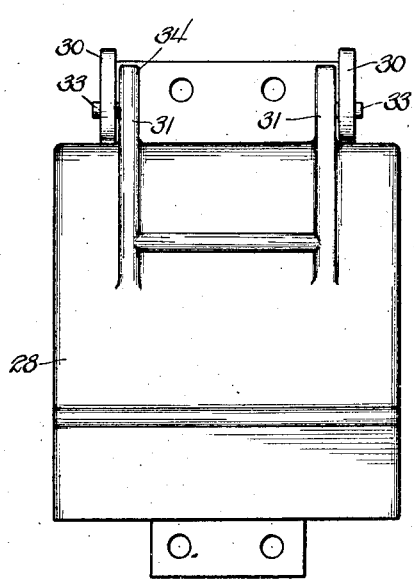
Fig. 1 is a front elevational view of a cable terminal housing showing the cover in closed position.
Figure 2:
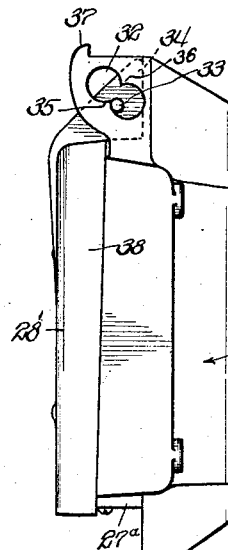
Fig. 2 is a side elevational view of the cable terminal housing also showing the cover in closed position.
Figure 3:
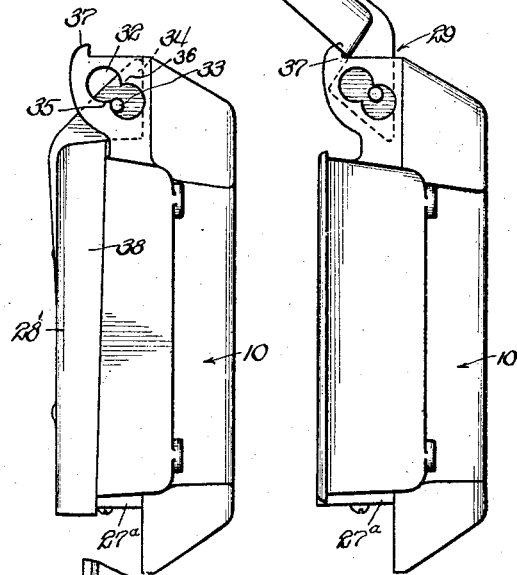
Fig. 3 is a side elevational view showing the cover in open position.
Figure 4:
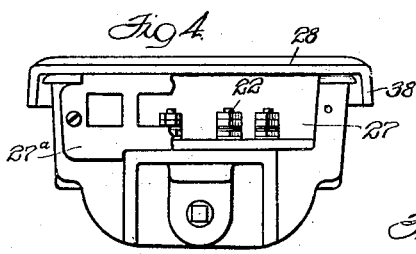
Fig. 4 is a view looking upwardly toward the structure as illustrated in Fig. 1; and, Fig. 5 is a view similar to Fig. 4, but showing the cover (partly broken away) in open position.
Figure 5:
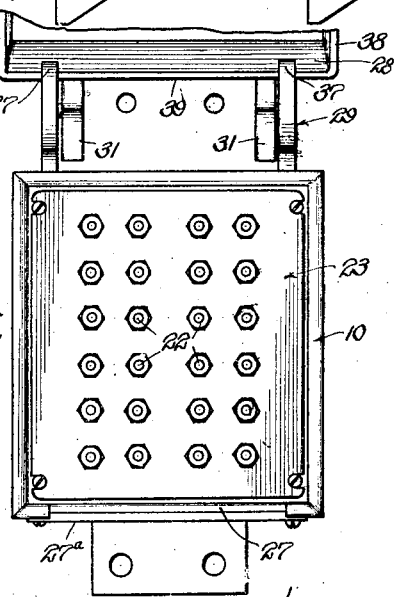

The large number of line wires in the form of "twisted pairs", not shown, extending from the binding posts 22 through the opening 27, provided with the usual fanning strip 27ª, will usually possess considerable bulk and would ordinarily have a tendency to bulge and force open the cover 28 unless the housing is made of unnecessarily large dimensions. It is, of course, important that the cover should remain closed for the exclusion of dust and moisture to as large an extent as possible. Consequently, I have provided at 29 a means for hingedly mounting the cover and for also serving as a latching means for retaining the cover when in its closed position and for restraining the line wires from bulging.

A pair of hinge knuckles 30 may be formed integral with the housing member 10 and may cooperate with a corresponding pair of pintle members 31 extending up from the cover member 28. The knuckles, as shown, are each formed with enlarged and elongated perforations 32 for receiving the small pintles 33. It will be noted that the pintle members 31 are formed with extensions at 34 and that the elongated perforations are interrupted approximately midway by a pair of bosses 35 and 36 extending inwardly from opposite sides of the perforations. The knuckles 30 may also be extended upwardly in the form of hooks 37. The cover should preferably be formed with side and top flanges 38 and 39 respectively, overlapping the walls of the housing member 10 and thus rendering the housing substantially weatherproof when the cover is in closed position.

The operation of the hinge means 29 will now be described in detail. When the cover is in its normal closed position, the pintles 33 will be wedged against the bosses 35 by reason of the weight of the cover and by the contact of the extensions 34 against the housing member 10. Accordingly, the cover will be latched in this closed position and securely retained against pivotal movement at the pintles. However, the cover may be easily opened by the operator by merely raising it in a vertical direction sufficiently to bring the pintles into the upper portions of the perforations 32. The extensions 34 will then obtain clearance in respect to the housing member 10 and the cover may consequently be opened by an outward and upward turning movement. The cover may then be retained or latched in its open upward position, as in Fig. 6, by hooking the flange 39 over the hook extensions 37 and with the pintles 33 bearing upwardly against the bosses 36.

Accordingly, it will be seen that a very simple form of hinge is provided which also may serve the additional purpose of latching the cover in either its closed or open position. With the cover latched in the open position, the operator will be free to use both hands in arranging the connections within the housing. It will further be noted that the above advantages are provided without sacrificing the weather-proof qualities of the device resulting from the use of the wide flanges 38 and 39.

While I have illustrated and described in detail one embodiment of my invention, it is to be understood that many modifications may be made thereto without departing from the spirit and scope of the appended claims.

Having thus described my invention, what I claim as new and desire to secure by Letters Patent in the United States, is:

1. A structure comprising a housing, a cover for a vertical side of said housing, hinge means adjacent the upper edge of said cover and comprising hinge knuckles that are attached to the housing and pintle supports and pintles that are attached to the cover, said hinge knuckles having enlarged perforations for receiving the pintles, said perforations having a lower wall portion inclined substantially toward the center of the housing, and said pintle supports having extensions at their extremities beyond the pintles for engaging the upper portion of the housing when the cover is in closed position, whereby when the cover is closed the pintles are fulcrumed on said lower inclined wall portions of the perforations thereby wedging said cover into a firmly closed position from which it may be swung open only after a substantially vertical thrust is imparted thereto.

2. A structure comprising a housing, a cover for a vertical side of said housing and having a flange at its upper edge, hinge means adjacent the upper edge of said cover and comprising hinge knuckles that are attached to the housing and pintle supports and pintles that are attached to the cover, and hooks attached to said housing that engage said flange of the cover when in open position, the said knuckles being provided with perforations having inclined surfaces that are engaged by said pintles whereby a wedging action is imparted to the cover to hold it firmly in closed position from which it may be swung to open position only after a substantially vertical thrust is imparted thereto.

3. A structure comprising a housing, a cover for a vertical side of said housing, hinge means adjacent the upper edge of said cover comprising hinge knuckles on the housing and pintle supports and pintles on the cover, said knuckles being provided with hooks at their upper edges and with elongated perforations for receiving the pintles, the hooks serving to engage the cover in open position and the pintles in the elongated perforations serving to wedge the cover in a firmly closed position from which it may be swung open only after being vertically moved to release the pintles in said perforations.

4. A structure comprising a housing, a cover for a vertical side of said housing, hinge means adjacent the upper edge of said cover comprising hinge knuckles attached to the housing and pintle supports and pintles attached to the cover, said knuckles being provided with hooks at their upper edges and with elongated perforations for receiving the pintles whereby the cover may be swung open and raised over said hooks to be held in open position by the hooks until again raised and swung back toward closed position, the walls of said perforations being inclined at the points of contact with the pintles when the cover is closed whereby when the cover is dropped to closed position the pintles will be forced toward the housing thereby exerting a wedging action upon said cover.

In witness whereof, I have hereunto subscribed my name.

JOHN C. BOGLE.